(No Model.)
A. PRYM.
COAT HANGER.
No. 532,580. Patented Jan. 15, 1895.
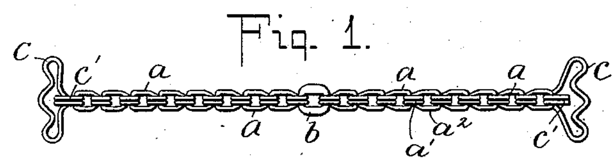
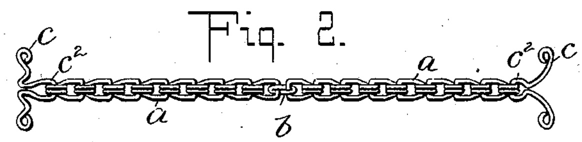
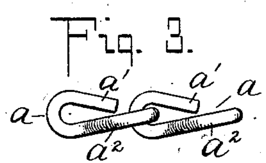
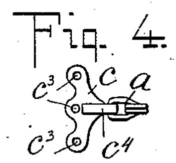
WITNESSES,
R. B. Shepherd.
Geo. E. Morse
INVENTOR,
August Prym,
BY
Briesen & Knauth
ATTORNEYS.
THE NORRIS PETERS CO., PHOTO-LITHO., WASHINGTON, D. C.

UNITED STATES PATENT OFFICE.

AUGUST PRYM, OF STOLBERG, GERMANY.

COAT-HANGER.

SPECIFICATION forming part of Letters Patent No. 532,580, dated January 15, 1895.

Application filed July 27, 1894. Serial No. 518,687. (No model.)

*To all whom it may concern:*

Be it known that I, AUGUST PRYM, a subject of the King of Prussia, German Emperor, and a resident of Stolberg, in the Province of the Rhine, Kingdom of Prussia, German Empire, have invented certain new and useful Improvements in Coat-Hangers, of which the following is a specification.

My invention relates to coat hangers, and has for its object to produce a coat hanger which shall possess the advantages of simplicity and cheapness, and which can be readily attached to a garment.

To this end my invention consists in a coat-hanger composed of a ring, chain sections and terminal attaching members, the chain sections being formed of links comprising a hook and an eye portion, the planes of which are at a right angle, the links being secured to one another by connecting the hook of each link to the eye of the adjacent link, and the chain sections being attached at one end to the ring and at the other end to the terminal members.

In the drawings forming part hereof—Figure 1 is a view of the coat hanger embodying my invention. Fig. 2 is a view of another form of coat hanger embodying my invention. Fig. 3 is a side view of two of the hook-shaped links of the coat-hanger to illustrate the method of attaching one link to the other. Fig. 4 is a view of a modified form of terminal attaching device or member.

In the drawings, *a a* are a series of hook-shaped links. These links are formed by taking short lengths of wire or sheet metal, bending or shearing the same to form an eye $a^2$, and bending up the free ends $a'$ to form the whole into a substantially hook-shaped link. Thereupon the hook portion of one link is passed through the eye of the next link, forming a chain.

In Fig. 1 two short lengths of chain thus formed are shown united by means of a ring *b* through which the hook portions of the terminal links of each section of chain pass so that the hooks of said links on opposite sides of the ring project in opposite directions.

*c* are the terminal attaching devices or members which may be of various forms, as shown in the drawings preferably with undulated shanks, being shown in Fig. 1 as provided with hook ends $c'$, which hook ends engage in the eyes of the terminal links of the chain sections, as shown.

In Fig. 2 I have shown the coat hanger as consisting of two short chain sections united by means of a ring *b*, which ring passes through the eyes of the chain sections instead of co-operating with the hook portion of the links, as described above. The chain length formed by these two chain sections thus united terminates in hook ends, as shown, which hook ends co-operate with terminal attaching devices or members *c* provided with eyes $c^2$ instead of hooks, as above described. Instead, however, of using terminal attaching devices or members made of wire, as shown in Figs. 1 and 2, I may make them of sheet metal in any desired shape, as shown in Fig. 4, wherein I have shown the terminal attaching device or member *c* as made of sheet metal and provided with fastening eyes $c^3$ for attaching the same to a garment, and a hook bill $c^4$ for engaging with the chain.

It will be quite obvious that the various forms of terminal attaching devices or members may be used interchangeably and may be of various constructions; so therefore I do not limit myself to the precise construction and arrangement shown in the drawings.

It will be observed that by interposing the ring *b* in the length of the chain of the character shown in the drawings, wherein the hook of each length is at right angles to the eye portion thereof, I am enabled to project in opposite directions the hook or eye portions of the links constituting the sections on opposite sides of the ring, and to thereby allow of the use of the same character of end fastenings on the hanger, whether they be hooks, as represented in Fig. 1, or eyes, as represented in Fig. 2. Furthermore, the changing of the direction of the links of the chain by the interposition of the ring enables the end fastenings to normally lie in alignment with each other, whereas, if the links all project in the same direction, the end fastenings would normally be at right angles to each other, thereby causing a wrenching strain thereon which would have a tendency to disconnect the hanger from the coat. No such liability is had in my hanger, since the end fastenings are normally aligned with each other.

What I claim, and desire to secure by Letters Patent, is—

A coat hanger consisting of a ring, chain sections and terminal attaching members, the chain sections being formed of links comprising a hook and an eye portion, the planes of which are at a right angle, the links being secured to one another by connecting the hook of each link to the eye of the adjacent link, and the chain sections being attached at one end to the ring and at the other end to the terminal members, substantially as described.

AUGUST PRYM.

Witnesses:
WM. EMMET,
JOHN HERKMANNS,
*Both of Aix-la-Chapelle.*